US008065358B2

(12) United States Patent
Batke et al.

(10) Patent No.: US 8,065,358 B2
(45) Date of Patent: Nov. 22, 2011

(54) PROXIED WEB ACCESS FOR CONTROL DEVICES ON INDUSTRIAL CONTROL SYSTEMS

(75) Inventors: Brian A. Batke, Novelty, OH (US); Gary W. Baczkowski, Seven Hills, OH (US); Kenwood H. Hall, Hudson, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1519 days.

(21) Appl. No.: 09/967,742

(22) Filed: Sep. 28, 2001

(65) Prior Publication Data
US 2002/0156838 A1    Oct. 24, 2002

Related U.S. Application Data

(60) Provisional application No. 60/285,292, filed on Apr. 20, 2001.

(51) Int. Cl.
*G06F 15/16* (2006.01)
(52) U.S. Cl. ...................................... 709/203
(58) Field of Classification Search .................. 709/218, 709/224, 246; 715/513; 700/65
See application file for complete search history.

(56) References Cited

U.S. PATENT DOCUMENTS

| 5,805,442 | A | * | 9/1998 | Crater et al. ....................... 700/9 |
| 5,975,737 | A | * | 11/1999 | Crater et al. ..................... 709/219 |
| 5,982,362 | A | * | 11/1999 | Crater et al. ..................... 709/219 |
| 6,061,603 | A |   | 5/2000 | Papadopoulos et al. |
| 6,151,625 | A | * | 11/2000 | Swales et al. .................. 709/218 |
| 6,161,051 | A | * | 12/2000 | Hafemann et al. ............. 709/217 |
| 6,282,454 | B1 |  | 8/2001 | Papadopoulos et al. |
| 6,381,502 | B1 | * | 4/2002 | Rudder et al. ................. 709/217 |
| 6,463,352 | B1 | * | 10/2002 | Tadokoro et al. ............. 700/169 |
| 6,484,061 | B2 | * | 11/2002 | Papadopoulos et al. ...... 709/217 |
| 6,505,086 | B1 | * | 1/2003 | Dodd et al. ...................... 700/65 |
| 6,587,884 | B1 | * | 7/2003 | Papadopoulos et al. ...... 709/230 |
| 6,640,140 | B1 | * | 10/2003 | Lindner et al. .................. 700/18 |

(Continued)

FOREIGN PATENT DOCUMENTS

| EP | 1251414 A2 | * | 10/2002 |
| WO | WO 9718636 A2 | * | 5/1997 |
| WO | WO 99/13418 A1 |  | 3/1999 |

OTHER PUBLICATIONS

Radwan, F. A. et al.,"Real-time monitoring and controlling of an Allen-Bradley SLC 500 through the Internet", IEEE Conference on Industrial Technology, v. 1, p. 387-392, Dec. 2003.*

(Continued)

*Primary Examiner* — Jeffrey R Swearingen
(74) *Attorney, Agent, or Firm* — Boyle Fredrickson, S.C.

(57) ABSTRACT

An industrial control system includes a plurality of control devices providing control signals to direct an industrial process and a web access module including a web server, an Internet interface and a control network interface. Each of the control devices includes web page data concerning a respective web page associated with the respective control device. The Internet interface is couplable to a remote device via the Internet, and the control network interface is coupled to the control devices. The web access module is able to receive requests from the remote device to access the web pages associated with the control devices. In response to the requests, the web access module obtains the web page data concerning the web pages for which access has been requested, processes the data at the server, and sends data signals related to the data onto the Internet to be received by the remote device.

21 Claims, 2 Drawing Sheets

U.S. PATENT DOCUMENTS

| | | | |
|---|---|---|---|
| 6,714,977 B1* | 3/2004 | Fowler et al. | 709/224 |
| 6,760,782 B1* | 7/2004 | Swales | 709/218 |
| 6,854,026 B1* | 2/2005 | Sexton et al. | 710/62 |
| 7,035,898 B1* | 4/2006 | Baker | 709/203 |
| 7,099,943 B1* | 8/2006 | Tondering | 709/226 |
| 2001/0003804 A1 | 6/2001 | Papadopoulos et al. | |
| 2001/0014833 A1 | 8/2001 | Brault | |
| 2002/0156837 A1* | 10/2002 | Batke et al. | 709/203 |
| 2002/0156838 A1* | 10/2002 | Batke et al. | 709/203 |
| 2002/0169850 A1* | 11/2002 | Batke et al. | 709/218 |
| 2003/0061299 A1* | 3/2003 | Brown et al. | 709/214 |
| 2004/0024891 A1* | 2/2004 | Agrusa et al. | 709/230 |

OTHER PUBLICATIONS

Barr, Michael, "Programmable Logic: What's it to ya?", Embedded Systems Programming Magazine, v. 12, No. 6, Jun. 1999.*

RFC 793: Transmission Control Protocol DARPA Internet Program Protocol Specification. Information Sciences Institute. Sep. 1981. 88 pp.*

Internetworking with TCP/IP: Volume One. Douglas E. Comer. Prentice Hall (2000). p. 226.*

* cited by examiner

PROXIED WEB ACCESS FOR CONTROL DEVICES ON INDUSTRIAL CONTROL SYSTEMS

CROSS-REFERENCE TO RELATED APPLICATIONS

This application claims the benefit of U.S. provisional patent application No. 60/285,292, filed on Apr. 20, 2001.

STATEMENT REGARDING FEDERALLY SPONSORED RESEARCH OR DEVELOPMENT

FIELD OF THE INVENTION

The present invention relates generally to industrial control systems for industrial processes, and in particular to a system for providing web access to individual programmable logic controllers, I/O modules and other control devices of such industrial control systems.

BACKGROUND OF THE INVENTION

Industrial control systems used to control and monitor industrial processes often employ programmable logic controllers, which are special purpose computers that operate based upon stored control programs and typically read inputs and provide outputs to the controlled industrial processes based upon the logic of their control programs. PLCs differ from conventional computers in two major respects. First, PLCs operate to produce highly reliable and predictable control outputs. The architecture and programming of PLCs are designed so as to provide predictable maximum response times, as well as a reduction in errors caused by race conditions and sensitive detection of hardware and communication errors. Second, PLCs differ from conventional computers in that PLCs are highly customizable so as to fit the demands of the particular industrial processes being controlled.

Depending upon the particular industrial process being controlled, an industrial control system can take a variety of forms. In some circumstances, the industrial control system includes numerous I/O modules that are all in communication with a single PLC. In other circumstances, multiple PLCs are employed in the industrial control system. The multiple PLCs can be networked together, and each PLC is typically in communication with its own particular associated I/O modules. In still additional circumstances, industrial control systems can take other forms that can include, for example, other types of control devices.

Although it is the PLCs of industrial control systems that primarily govern the operation of the industrial control systems with respect to the industrial processes of interest, in a variety of circumstances it is desirable to be able to remotely monitor (and, in some instances, control) the operation of the industrial control systems and the progress of the industrial processes. Conventional industrial control systems allow for communications between PLCs and remote human machine interfaces such as computer terminals by way of proprietary communication links or dedicated phone lines.

However, recently a new communications medium known as the Internet or World Wide Web (or simply the "web") has emerged as an important if not dominant communications medium for networking among computers and computer systems around the world. Given the ubiquity and simplicity of using the web, it has become desirable that industrial control systems be capable of communications with remote computer terminals or other remote devices by way of the web.

Yet conventional industrial control systems are not readily configured for web communications. On the one hand, the control devices commonly implemented within industrial control systems typically do not have the large amounts of memory and processing powers that are necessary for implementation of web server programs/applications. On the other hand, implementation of a single web server program for an entire industrial control system can impose significant programming burdens, particularly when the operation or configuration of the individual control devices is frequently changing. In practice, implementation of a single web server for an entire industrial control system can render it difficult to provide sufficient independent accessibility of the individual control devices of the industrial control system It would therefore be advantageous if a new industrial control system could be developed that allowed remote computer terminals and other remote devices to communicate with individual control devices of the industrial control system by way of the web. It would also be advantageous if the new industrial control system allowed web communications with the various individual PLCs, I/O modules and/or other control devices of the industrial control system despite any memory or processing power limitations of those control devices.

BRIEF SUMMARY OF THE PREFERRED EMBODIMENT

The present inventors have provided an industrial control system that allows for web access to individual control devices of the industrial control system even when those control devices do not have the ability to support web server functionality, and further allows for such web access without the need for extensive programming or reprogramming of a central web server to account for changes in the control devices. This is accomplished by separating portions of the web data (e.g. web pages), which are stored at the individual control devices, from the web server function, which is performed at a central web access module. Because the control devices only store the portions of the web data, the control devices can therefore be simple devices without significant processing power or memory. Further, because the portions of the web data are obtained by the central web access module from the respective control devices, the web server does not need to be reconfigured when there are changes to the control devices.

Using the portions of the web data, the web access module is able to respond to requests from remote devices provided to the industrial control system over the web. The particular control devices from which the web access module obtains the portions of the web data correspond to the specific requests provided from the remote devices. Depending upon the embodiment, the web access module can obtain additional web data or formatting information from other data sources besides the control devices, which the web access module utilizes in providing its responses to the requests from the remote devices. Further, once the information corresponding to the requested web pages has been provided, the web access module is capable of receiving, from the remote devices, additional commands related to the requested web pages and is capable of responding to those additional commands.

In particular, the present invention relates to an industrial control system for controlling an industrial process. The industrial control system includes a plurality of control devices providing control signals to direct the industrial process, and a web access module including a web server, an Internet interface and a control network interface. Each of the control devices includes web page data concerning a respective web page associated with the respective control device. The Internet interface is capable of being coupled to a remote device via the Internet, and the control network interface is coupled to the plurality of control devices. The web access module is capable of receiving requests from the remote device to access any of the web pages associated with the plurality of control devices. In response to receiving the requests, the web access module obtains the web page data concerning the web pages for which access has been requested, processes the web page data at the web server, and sends data signals related to the web page data onto the Internet to be received by the remote device.

The present invention further relates to an industrial control system including a plurality of control devices each of which includes web page data concerning a respective web page associated with the respective control device. The industrial control system additionally includes a server means for processing requests received from remote devices over the Internet, for obtaining appropriate portions of the web page data from the control devices in response the requests, and for providing sufficient amounts of information based upon the appropriate portions of the web page data over the Internet to the remote devices so that browser programs at the remote devices are able to generate requested web pages.

The present invention additionally relates to a method of providing, via the Internet, access to web pages associated with control devices in an industrial control network. The method includes receiving a request at a web server from a remote device, the request being provided over the Internet, and processing the request to determine an identity of a requested web page corresponding to one of the control devices. The method further includes sending a signal in response to the request to the one of the control devices to which the requested web page corresponds, receiving web page data concerning the requested web page from the one of the control devices, and providing the requested web page onto the Internet for transmission to the remote device.

DETAILED DESCRIPTION OF THE PREFERRED EMBODIMENT

Figure 1:
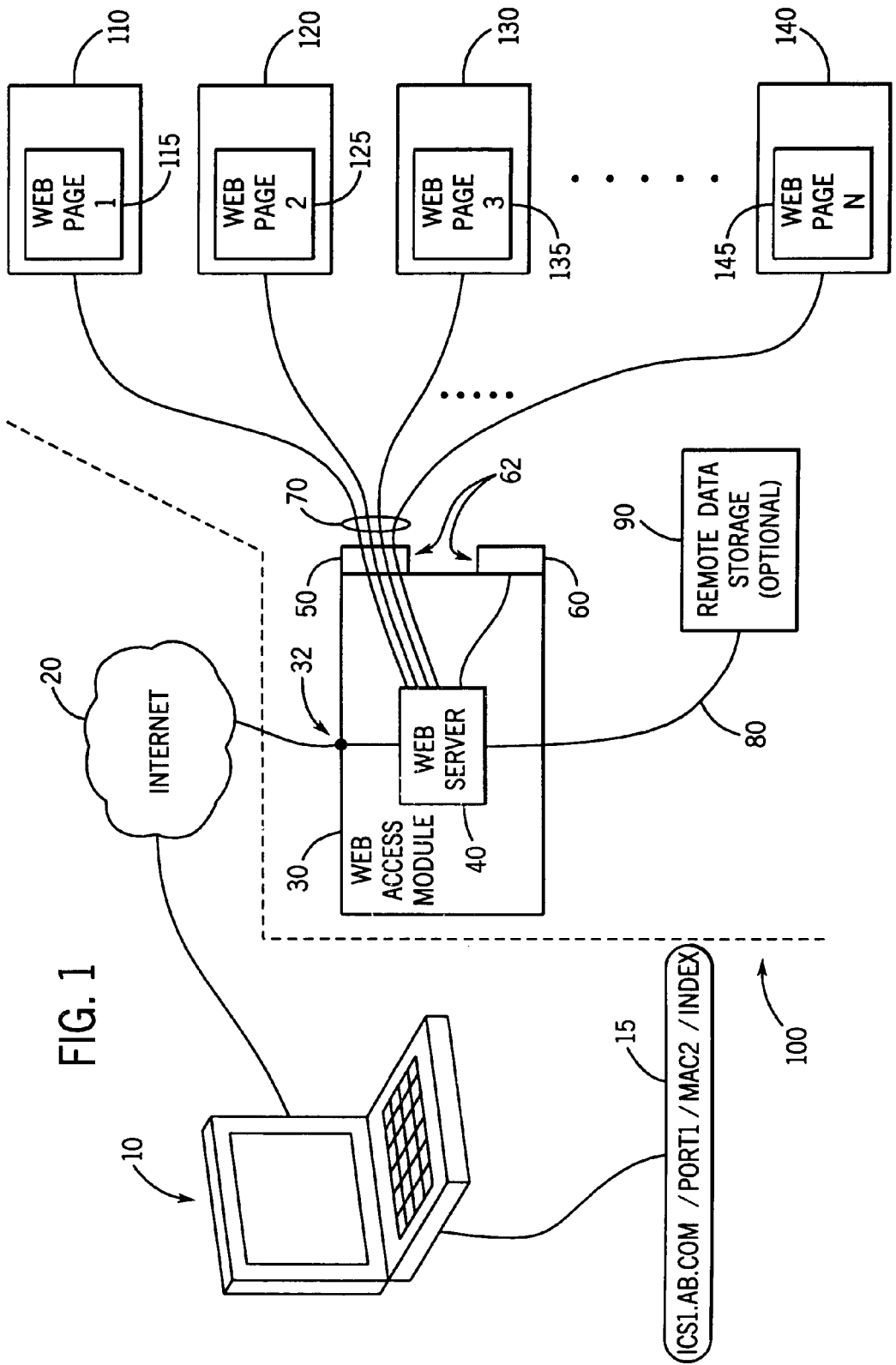
FIG. 1 is a schematic diagram showing an exemplary industrial control system including multiple control devices coupled to a web access module, where the web access module is in communication with remote devices by way of the Internet and allows the remote devices to access individual web pages associated with the different control devices.

Referring to FIG. 1, an industrial control system 100 according to the present invention is shown that is accessible by way of the Internet 20 or World Wide Web (or simply the "web") to one or more remote computer terminals or other remote devices 10.

The industrial control system 100 includes a web access module 30 that is coupled to the Internet 20 by way of an Internet interface 32. The industrial control system 100 further includes one or more control devices, shown as including control devices 110, 120, 130 and 140, which are coupled to a network interface 62 of the web access module 30 by way of respective communication links 70. The network interface 62 can include one or more ports, which are in the present embodiment shown to include a first port 50 and a second port 60. Within the web access module 30, and coupled to the Internet interface 32 and the ports 50, 60 of the network interface 62 is a web server 40. Further, in certain embodiments, the industrial control system 100 additionally includes a remote data storage unit 90, which is coupled to the web access module 30 and to the web server 40 by way of a communication link 80. In alternate embodiments, the remote data storage unit 90 can be located physically away from the remainder of the industrial control system 100, or can even be coupled to the web access module 30 by way of the Internet 20.

The control devices 110-140 coupled to the web access module 30 are those elements of the industrial control system 100 for which web access is potentially desired by users at remote computer terminals or other remote devices 10. The control devices 110-140 that are coupled to the web access module 30 need not be exhaustive, or even a significant representation, of all of the control devices of the industrial control system 100. The control devices 110-140, however, are employed to control various elements or aspects of an industrial process. In certain embodiments, the control devices 110-140 are or include input/output (I/O) modules, motor controllers or other devices, including even programmable logic controllers (PLCs). Also, in certain embodiments, some of the control devices 110-140 that are coupled to the web access module 30 can be one type of control device (e.g., an analog I/O device), while others are a different type of control device (e.g., a motor controller).

Common to all of the control devices 110-140 that are coupled to the web access module 30 is that each of the control devices 110-140 includes a respective portion of data 115, 125, 135 and 145 that can be utilized to generate a home page or other web page related to that respective control device 110, 120, 130 and 140. The exact amounts of web page data that exist in the control devices 110-140 can vary depending upon the embodiment of the industrial control system 100 as well as upon the particular control device within the industrial control system. In certain embodiments, the web page data can include all data that is required by the web server 40 in order to generate the particular web page, for example, hypertext markup language (html) documents and graphics files. In alternate embodiments, the web page data only includes a limited amount of data that can be indicative of a particular status or other condition of the control device or an element or aspect of the industrial process being controlled, such as a device ID and a single alphanumeric character representative of a temperature or other measurement parameter. In such embodiments, the web server 40 typically accesses its own memory using the device ID as an index in order to obtain the remaining information necessary to generate the web page corresponding to that particular control device. The information at the memory of the web server 40 can be a template html document keyed to the type of device, for example, a html table where the measurement parameter is listed in the table.

In certain embodiments, the web server 40 will store or have stored at the remote data storage unit 90 the various templates described above that are available for the generating of web pages. Upon receiving a request for a particular web page from one of the remote devices 10 via the Internet 20, the web server 40 obtains the relevant data from the control device corresponding to the requested web page by way of the appropriate communication link 70, and then implements that data along with appropriate template data to generate the web page.

In further embodiments, the data 115-145 stored at the respective control devices 110-140 can include various types of alphanumeric text elements, hyperlinks, banner ads, and JAVA applets. Additionally, in certain embodiments, the data stored at one or more of the control devices 110-140 can include extensible markup language (XML) information, which is used to define the meaning of data elements on a web page. In such an embodiment, the web server 40 or an associated device (including the remote data storage unit 90) in turn will store XML style sheet language transformations (XSLT) data, which can be used to convert the XML data provided from the control devices into a format for screen display. In such case, the web server 40 will include a XSLT processor.

Thus, by utilizing the various data stored at the control devices 110-140 and (in many other embodiments) at other locations including at the web server 40 and the remote data storage unit 90, the web server 40 is able to generate web pages that are then sent via the Internet interface 32 over the Internet 20 to the remote devices 10. Because the amounts of data 115-145 that are stored at the control devices 110-140 can be expanded or reduced depending upon the particular embodiments of the industrial control system 100, it is possible to design industrial control systems in which relatively little memory is required at the control devices 110-140 for storing the web page data. Further, as the control devices 110-140 are changed or reconfigured, the web pages served by the web access module 40 change automatically without reprogramming of the web access module. Additionally, because all web server functionality is performed at the web server 40, no server programming or processing power is required at the control devices. Thus, the web access module acts as a proxy for actual web servers located at each of the control devices, and can be said to provide proxied web access.

Users at the remote devices 10 can indicate their desire to access particular web pages of particular control devices of a given industrial system by providing specific domain names or uniform resource locators (URLs) indicative of particular IP addresses that are indicative of the particular control devices of the particular industrial control system. In alternate embodiments where the IP address is only indicative of the particular industrial control system as a whole or the web access module 30, additional port information is typically provided by the user when entering the domain name. For example, for the industrial control system 100 in FIG. 1, which is shown to include four different control devices 110-140 that are all coupled to the first port 50 by way of four respective communication links 70, the domain name information specified by the user at the remote device 10 when desiring to access the home page corresponding to the control device 120 could be the domain name 15 shown in FIG. 1. As shown, this domain name, in addition to including the IP address "ICS1.AB.COM", additionally includes a port specification indicative of the first port 50, namely "port 1", and also indicates further port information labeled "MAC2" indicating the second control device, namely, control device 120. As is known in the art, the term MAC refers to an address peculiar to a particular media access control protocol, which in this case is the media access control protocol used for communication between the second control device 120 and the web access module 30. In contrast, in an embodiment where each individual control device of interest is identified by way of a corresponding separate IP address, the remote user at the remote computer terminal 10 can access the corresponding home page simply by typing a domain name such as simply ICS1.AB.COM.

Figure 2:
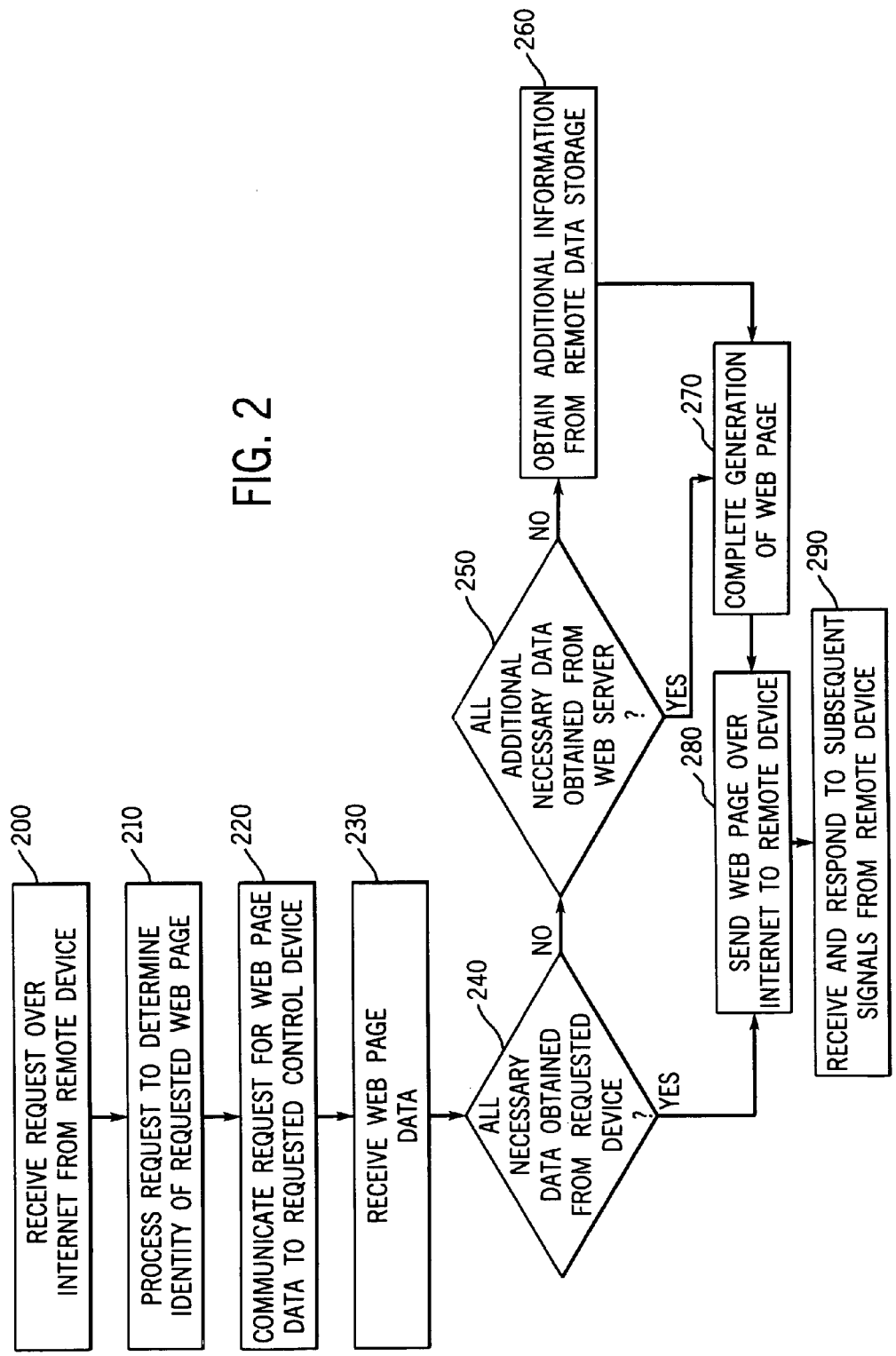
FIG. 2 is a flow chart showing exemplary steps of operation of the industrial control system of FIG. 1 when it communicates with a remote device in order to provide a web page associated with one of the control devices to the remote device.

In turning to FIG. 2, exemplary steps of operation of the industrial control system 100 in allowing the control devices 110-140 to be accessed via the Internet 20 are provided. In a first step 200, the web access module 30 receives a request provided over the Internet 20 from one of the remote computer terminals or other remote devices 10. In step 210, the web access module 30, particularly the web server 40, processes the initial request to determine the identity of the requested web page and thus the identity of the control device with which that web page is associated. This processing can include mapping of URLs to particular MACs. Next, at step 220, the web server 40 communicates a request for the web page data stored at the control device corresponding to the requested web page. The request is provided over the one of the communication links 70 that is coupled to the one of the control devices 110-140 that is associated with the requested web page. At step 230, the web server 40 receives the web page data that was stored at that control device.

Next, at step 240, the web server 40 determines whether all of the information that is necessary for generating the requested web page has been obtained from the requested control device. In certain embodiments, the information obtained from the control device will be sufficient for generating the requested web page. The web server 40 then processes and transmits this web page information via the Internet 20 to the remote device 10 that made the initial request, at step 280. In other embodiments, additional information will need to be obtained from another source to compliment the data received from the particular control device in order to generate the requested web page. In such case, at step 250, the web server 40 obtains various information that is stored at the web server, assuming such information exists. If all additional necessary data can be obtained from the web server 40 (or more specifically, the memory associated with the web server), the web server then proceeds to step 270, at which it completes generation of the requested web page. The system then proceeds to step 280 at which the requested web page is transmitted over the Internet 20 to the remote computer terminal 10. If all of the additional data that is necessary for generating the requested web page cannot be obtained from the web server 40 itself, additional information is obtained from another source such as the remote data storage unit 90, at step 260. Then, at step 270, the web server 40 can complete a generation of the requested web page and then send the requested web page over the Internet 20 to the remote device 10 at step 280.

Once the web page information has been sent to the remote device 10, additional communications can occur among the remote device 10, the web server 40, the control devices 110-140 and the remote data storage unit 90, among other devices, in providing and processing additional amounts of information that can include, for example, information for generating additional web pages or portions of web pages such as hyperlinks, banner ads and XML information. Where more than one web page corresponding to a particular one of the control devices 110-140 can be generated, the various control devices 110-140 can store data corresponding to more than one web page. Consequently, in such embodiments, the receipt of web page data that occurs in step 230 can sometimes only include the receipt of a portion of the total data stored on the particular control device. That is, in certain embodiments, the obtaining of data by the web server 40 from a given one of the control devices 110-140 can proceed through a successive set of stages.

While the foregoing specification illustrates and describes the preferred embodiments of this invention, it is to be understood that the invention is not limited to the precise construction herein disclosed. The invention can be embodied in other specific forms without departing from the spirit or essential attributes of the invention. Accordingly, reference should be made to the following claims, rather than to the foregoing specification, as indicating the scope of the invention.

We claim:

1. An industrial control system for controlling an industrial process comprising:
   a plurality of control devices providing control signals to direct the industrial process by outputting signals to the controlled industrial process within a predictable maximum response time, wherein each of the control devices includes web page data concerning a respective web page associated with the respective control device;
   a web access module including a web server, an Internet interface and a control-network interface the control network interface providing communications on the communication link within a predictable maximum response time;
   wherein the Internet interface is capable of being coupled to a remote device via the Internet, and wherein the control-network interface is coupled to a plurality of control devices through the communication link being at least a portion of a network separating the control devices with webpage data from the web access module holding the server;
   wherein the web access module is capable of receiving requests from the remote device to access any of the web pages associated with a plurality of control devices identified by an Internet address unique to a control device; and
   wherein, in response to receiving the requests, the web access module obtains the web page data concerning the web pages for which access has been requested, processes the web page data at the web server, and sends data signals related to the web page data onto the Internet to be received by the remote device.

2. The industrial control system of claim 1, wherein the web page data concerning the web pages includes HTML data.

3. The industrial control system of claim 1, wherein the web page data included on at least one of the plurality of control devices includes all web page information needed by the remote device in order for a browser program at the remote device to formulate the respective at least one web page.

4. The industrial control system of claim 1, wherein the web page data included on at least one of a plurality of control devices is limited to an alphanumeric text element.

5. The industrial control system of claim 1, wherein the web page data on at least one of a plurality of control devices includes a hyperlink.

6. The industrial control system of claim 1, wherein the web page data on at least one of a plurality of control devices includes at least one of a banner ad and a JAVA applet.

7. The industrial control system of claim 1, wherein each of the respective web pages associated with the respective control devices is a home page for that respective control device.

8. The industrial control system of claim 1, wherein the web page data obtained by the web access module from a first of the control devices, in response to a first request from the remote device, is not sufficient to allow a browser at the remote device to generate the respective web page associated with the first control device, and wherein the web access module provides additional information so that a combination of the web page data and the additional information is sufficient to allow the browser to generate the respective web page associated with the first control device.

9. The industrial control system of claim 8, wherein the web access module includes a memory device in which a plurality of web page templates are stored, wherein the web server of the web access module is capable of selecting an appropriate web page template corresponding to the respective web page associated with the first control device in response to the first request, and wherein the web server obtains the appropriate web page template as the additional information to determine the combination of the web page data and the additional information.

10. The industrial control system of claim 1 further comprising a remote data storage unit coupled to the web access module, wherein additional web page data is stored in the remote data storage unit.

11. The industrial control system of claim 10, wherein a portion of the additional web page data stored in the remote data storage unit is obtained by the web access module in response to a first request from the remote device, and wherein the web page data obtained by the web access module from a first of the control devices, in response to the first request from the remote device, is combined with the portion of the additional web page data obtained from the remote data storage unit, in order to provide sufficient data to a browser at the remote device to allow the browser to generate the respective web page associated with the first control device.

12. The industrial control system of claim 11, wherein the remote data storage unit is coupled to the web server by way of the Internet.

13. The industrial control system of claim 10, wherein further web page data is stored at the web access module.

14. The industrial control system of claim 1, wherein a first request from the remote device to access the respective web page associated with a first of the control devices includes an IP address followed by a port address, wherein the IP address identifies the web server, wherein the port address corresponds to the first control device, and wherein the web server establishes a connection with the first control device in response to the first request.

15. The industrial control system of claim 1, wherein each of the requests to access each of the respective web pages associated with the control devices includes only a respective IP address.

16. The industrial control system of claim 1, wherein the web page data at the control devices includes xml data.

17. The industrial control system of claim 16, wherein xslt data is stored at one of the web access module and a remote data storage unit.

18. The industrial control system of claim 1, wherein the control devices are selected from the group comprising programmable logic controllers and I/0 devices, and wherein the Internet interface is capable of being coupled to a plurality of remote devices via the Internet.

19. A method of providing, via the Internet, access to web pages associated with control devices in an industrial control network, the control devices providing control signals to direct the industrial process by outputting signals to the controlled industrial process within a predictable maximum response time, wherein each of the control devices includes web page data concerning a respective web page associated with the respective control device, the method comprising:
   receiving a request at a web server from a remote device, the request being provided over the Internet;

processing the request to determine an identity of a requested web page corresponding to one of the control devices;

sending a signal in response to the request to the one of the control devices to which the requested web page corresponds via a control network operating to provide predictable maximum response time, the network separating the control devices with webpage data from the web server;

receiving web page data concerning the requested web page from the one of the control devices via the control network; and providing the requested web page onto the Internet for transmission to the remote device.

20. The method of claim of claim 19 further comprising: obtaining additional data concerning the requested web page from an additional device and generating the requested web page by combining the web page data and the additional data.

21. The method of claim 20, wherein the additional device from which the additional data is obtained is at least one of the web server and a remote data storage unit.

* * * * *